UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

BLUE GLYCOCOL DYE.

SPECIFICATION forming part of Letters Patent No. 620,442, dated February 28, 1899.

Application filed December 27, 1897. Serial No. 663,714. (Specimens.)

*To all whom it may concern:*

Be it known that KARL HEUMANN, deceased, late a citizen of Zurich, Switzerland, did invent a new and useful Improvement in the Manufacture of a New Blue Coloring-Matter, of which the following is a specification, and for which patents have been obtained in the following countries: England, No. 8,726, dated June 5, 1890; Italy, XXV, 29,033, LVII, 64, dated September 30, 1890; Germany, No. 61,712, dated December 30, 1890; France, No. 206,567, dated January 20, 1891; Belgium, No. 93,516, dated February 16, 1891; Spain, No. 11,686, dated April 17, 1891; Austria-Hungary, No. 41/2,103, XXV, 1,993, dated August 3, 1891, and Russia, No. 8,360, dated July 11 and 23, 1892.

In pursuing investigations of the formation of coloring-matter of the indigo series by heating certain aromatic glycocols with alkalies and oxidizing the leuco compounds so obtained, as described in German Patent No. 54,626, said inventor found further that ethyl-ortho-tolyl-glycocol can also be successfully converted by this method into an indigo coloring-matter.

Ethyl-ortho-tolyl-glycocol can be made in different ways—as, for example, by ethylating ortho-tolyl-glycocol or by the reaction of mono-chlor-acetic acid on mono-ethyl-ortho-toluidin. There is given below a method which yields good results.

One molecule of mono-chlor-acetic acid is heated with two molecules of mono-ethyl-ortho-toluidin for two hours to 100° centigrade and then for six to eight hours to 120° centigrade. The mass is next thrown into water, mixed with an excess of alkali, and the precipitated mono-ethyl-ortho-toluidin is separated from the watery solution. The latter is then carefully acidulated with hydrochloric acid, when the glycocol separates partially as an oil. The portion which still remains in solution may be obtained by extraction with ether. In this manner is obtained the ethyl-ortho-tolyl-glycocol in the form of a thick yellowish oil, which, however, crystallizes after some time. Recrystallized from benzene it melts at 63° to 64° centigrade. It is easily soluble in alcohol, ether, benzene, and glacial acetic acid, but not so easily soluble in water. With alkali it yields easily-soluble salts.

The conversion of the ethyl-ortho-tolyl-glycocol into indigo coloring-matter is effected by melting with caustic alkalies (using, say, one part of ethyl-ortho-tolyl-glycocol to two parts dry caustic potash) and oxidizing the leuco compound which is formed. The melting is conducted in such a way that a temperature of about 350° centigrade is quickly reached, and then this temperature is maintained for a few minutes. Take tests from time to time and dissolve in water and pass air through. As soon as no increase in the quantity of blue dyestuff formed in successive test portions can be noticed the melt is complete. After dissolving the melt in water the leuco compound is oxidized by the air and the precipitate formed is filtered, washed, and dried. The dyestuff is thus obtained in an insoluble form. The dyestuff so obtained is a dark blue powder, which is nearly insoluble in alcohol. It can be introduced into a vat and is converted into a water-soluble form by sulfonating. It differs from ordinary indigo by yielding somewhat greener hues on cotton in the vat and by dyeing wool with its sulfo acid a somewhat redder shade. When melted with an excess of caustic soda, the coloring-matter is decomposed and an oil distils off which consists mainly of ortho-toluidin.

The coloring-matter produced from ethyl-ortho-tolyl-glycocol can be converted into a sulfonic acid soluble in water by heating it with about ten times as much concentrated sulfuric acid on the water-bath for some time or by introducing it into four or five times as much slightly-fuming sulfuric acid and heating for a few hours to about 50° to 60° centigrade. This sulfonated mixture can be used directly on dyeing. If it is desired to separate the sulfonic acid from it, the mixture is poured into ice-water, precipitated with common salt, filtered, pressed, and dried. The above said conditions in the temperature and duration of it can be varied in very wide limits.

It is the intention to cover hereby the dyestuff without limitation as to whether it be in the unsulfonated or sulfonated form.

What is claimed as new, and desired to be secured by Letters Patent, is—

1. The process for the manufacture of coloring-matters of the indigo series, consisting in heating ethyl-ortho-tolyl-glycocol with caustic alkali, and converting the leuco compound so produced into the coloring-matter by oxidation, substantially as hereinbefore described.

2. As a new article of manufacture the blue coloring-matter, which can be derived from ethyl-ortho-tolyl-glycocol and which is when unsulfonated nearly insoluble in alcohol and in the vat gives greener hues on cotton than ordinary indigo and when melted with an excess of caustic soda it is decomposed and yields a distillate consisting mainly of ortho-toluidin and when sulfonated is soluble in water and capable of use directly in dyeing, all substantially as hereinbefore described.

LIVINGSTON GIFFORD,
*Administrator of the estate of Karl Heumann, deceased.*

Witnesses:
M. WILSON,
J. E. GREER.